United States Patent [19]

Morawetz et al.

[11] 3,960,817
[45] June 1, 1976

[54] SOLID PHASE POLYESTER POLYCONDENSATION

[75] Inventors: Gottfried Morawetz; Lothar Buxbaum, both of Kufstein, Austria

[73] Assignee: Ciba-Geigy AG, Switzerland

[22] Filed: Aug. 30, 1973

[21] Appl. No.: 392,934

Related U.S. Application Data

[63] Continuation of Ser. No. 192,048, Oct. 26, 1971, abandoned.

[30] Foreign Application Priority Data

Oct. 23, 1970  Austria .................................. 9574/70

[52] U.S. Cl. ............................ 260/75 M; 260/75 T
[51] Int. Cl.² ........................................ C08G 17/003
[58] Field of Search ............................... 260/75 M

[56] References Cited
UNITED STATES PATENTS

| | | |
|---|---|---|
| 2,901,466 | 8/1959 | Kibler et al. .............................. 260/75 |
| 2,921,052 | 1/1960 | Caldwell et al. ....................... 260/75 |
| 3,544,523 | 12/1970 | Maxion ................................. 260/75 |
| 3,544,525 | 12/1970 | Balint et al. ........................... 260/75 |
| 3,576,773 | 4/1971 | Vaginay ................................. 260/22 |
| 3,728,309 | 4/1973 | Maxion ................................. 260/75 |
| 3,801,547 | 4/1974 | Hoeschele .......................... 420/75 |
| 3,816,377 | 6/1974 | Okuzumi ............................. 260/75 |

FOREIGN PATENTS OR APPLICATIONS

1,027,613  4/1966  United Kingdom

*Primary Examiner*—Murray Tillman
*Assistant Examiner*—T. Pertilla
*Attorney, Agent, or Firm*—Berman, Aisenberg & Platt

[57] ABSTRACT

Solid phase polycondensation of thermoplastic polyester melt precondensate is effected at a temperature from 50° to 5°C below the melting point of the precondensate, at a vacuum below 1 torr and in contact with a streaming inert gas.

15 Claims, 3 Drawing Figures

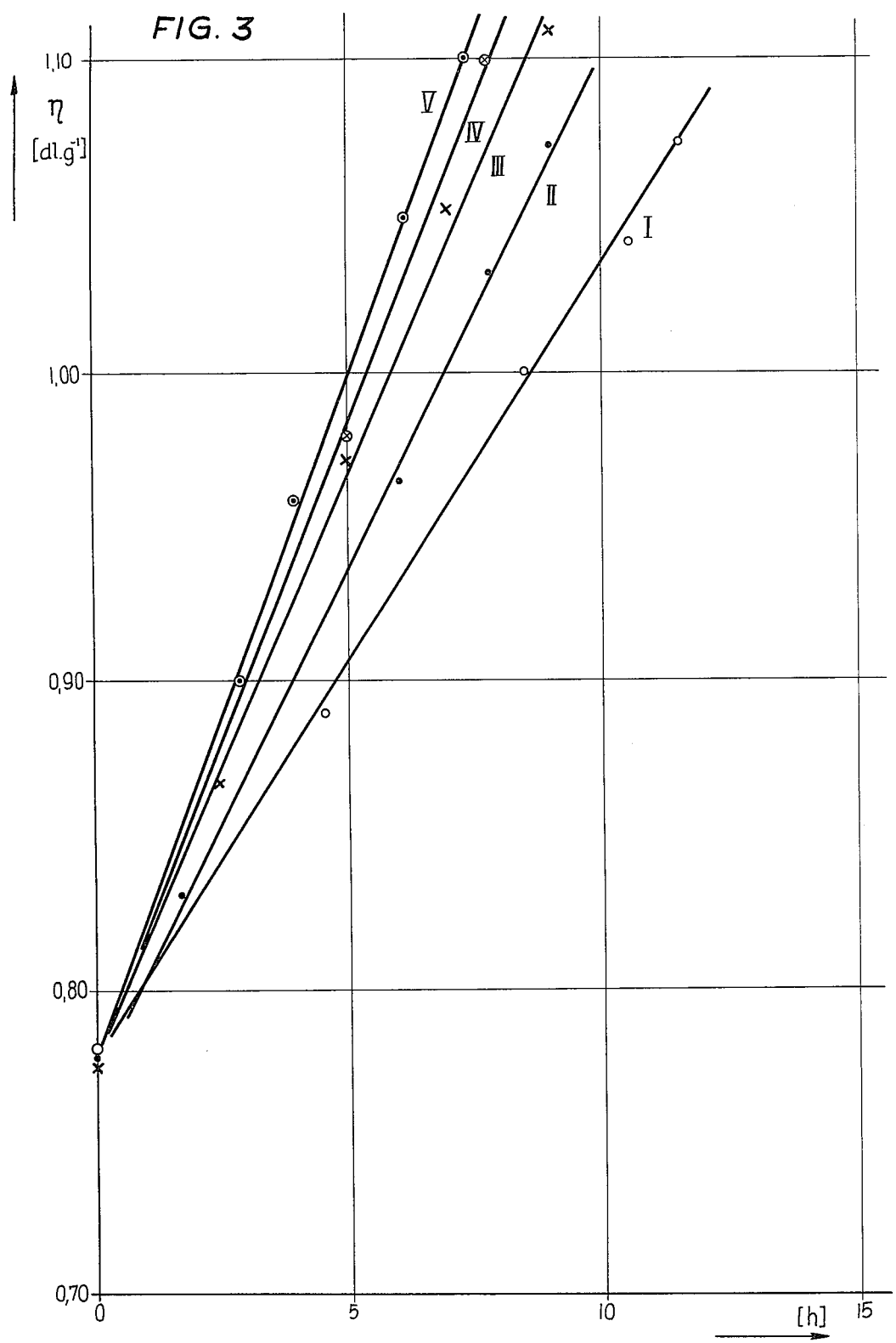

SOLID PHASE POLYESTER POLYCONDENSATION

CROSS-REFERENCE TO RELATED APPLICATION

The present application is a continuation of application Ser. No. 192,048, filed Oct. 26th, 1971, and now abandoned.

BACKGROUND

British Pat. No. 1,066,162 suggests subjecting a polyethylene terephthalate melt condensate [relative viscosity of at least 1.65 (measured in a 1% solution of the polyester in dichloroacetic acid at 25°C), which corresponds to a polyester intrinsic viscosity of 0.54 dl/g (measured in a 1% solution of the polyester in phenol/-tetrachloroethane in a weight ratio of 1:1 at 30°C)] to polycondensation in the solid phase.

[Only intrinsic viscosity values are indicated in the following text, the correspondng values of relative viscosity may be read from FIG. 1, which shows the relation between the relative viscosity of a solution of 1% polyethylene terephthalate in dichloroacetic acid determined at 25°C and the intrinsic viscosity of a solution of 1% polyethylene terephthalate in phenol/tetrachloroethane (1:1 per weight) at 30°C.]

In the processes of the British patent, the reaction products which are volatile at polycondensation temperatures of 210° to 235°C (consisting mainly of ethylene glycol) are kept at a partial pressure of less than 2 mm mercury until the desired degree of polycondensation is reached. The adjustment of the partial pressure to a value of less than 2 mm of mercury is achieved by either a. application of a vacuum or
b. maintaining a gas stream at atmospheric pressure.

The streaming gaseous medium serves for the removal of the volatile reaction products and consists of a gas which is chemically inert to polyethylene terephthalate and which contains no free oxygen; carbon dioxide, sulfur hexafluoride, nitrogen or methane is suggested. When applying an inert gas stream, the inert gas is advantageously recirculated to the polycondensation vessel after separation of volatile reaction products therefrom.

The processes suggested in the British Patent Specification have a series of disadvantages. In order to achieve a high degree of polycondensation, as reflected by, e.g., an intrinsic viscosity of 1.10 dl/g, starting from intrinsic viscosity values of 0.67 dl/g and 0.85 dl/g, very long polycondensation times must be expected. Polycondensation times of more than 20 hours are the rule, especially in those cases where polycondensation is carried out under application of a vacuum. The desired intrinsic viscosity of 1.10 dl/g may be achieved faster by application of an inert gas stream under atmospheric pressure at simultaneous high streaming (of inert gas) rates. This advantage, however, is gained at the expense of increasingly elaborate devices and increased consumption of energy brought about by the maintenance of a high inert gas streaming rate and the elimination of volatile reaction products.

SUMMARY

Larger increases in intrinsic viscosity per unit time are achieved in relatively short periods by solid phase polycondensation of thermoplastic polyester melt precondensate while maintaining an essentially constant temperature at from 50° to 5° below the melting point of the precondensate, a pressure of less than 1 torr and the precondensate in contact with an inert gas stream moving at a rate of less than two liters per hour per kilogram of the solid phase condensate. Total reaction time to attain a desired intrinsic viscosity is also reduced by this method.

Elaborate recovery of reaction and decomposition products required when applying an inert gas pressure of 1 atmosphere can be omitted. Due to the small amount of inert gas used, recovery of a purified inert gas can also be foregone.

It is surprising that such a very low inert gas streaming rate brings about a marked acceleration of solid phase condensation. That the low concentration of the inert gas molecules would increase the speed of diffusion of the reaction product or that the polycondensation rate of solid phase condensation could be increased by application of such a minor inert gas streaming rate in vacuo as compared to that at atmospheric pressure and at high inert gas streaming rates could not be expected. The present polycondensation process makes possible a reduction in polycondensation time to less than 10 hours, starting from intrinsic viscosities of between 0.67 and 0.85 dl/g and achieving an intrinsic viscosity of 1.10 dl/g.

As distinguished from the disclosure of the noted British patent, the subject process has the further advantage that the increased polycondensation rate does not diminish even when a higher degree of polycondensation is reached.

BRIEF DESCRIPTION OF THE DRAWINGS

FIGS. 2 and 3 are graphs which illustrate the effect of different inert gas rates on the rate of polyester intrinsic viscosity increase during solid phase polycondensation.

DETAILS

Figure 1:
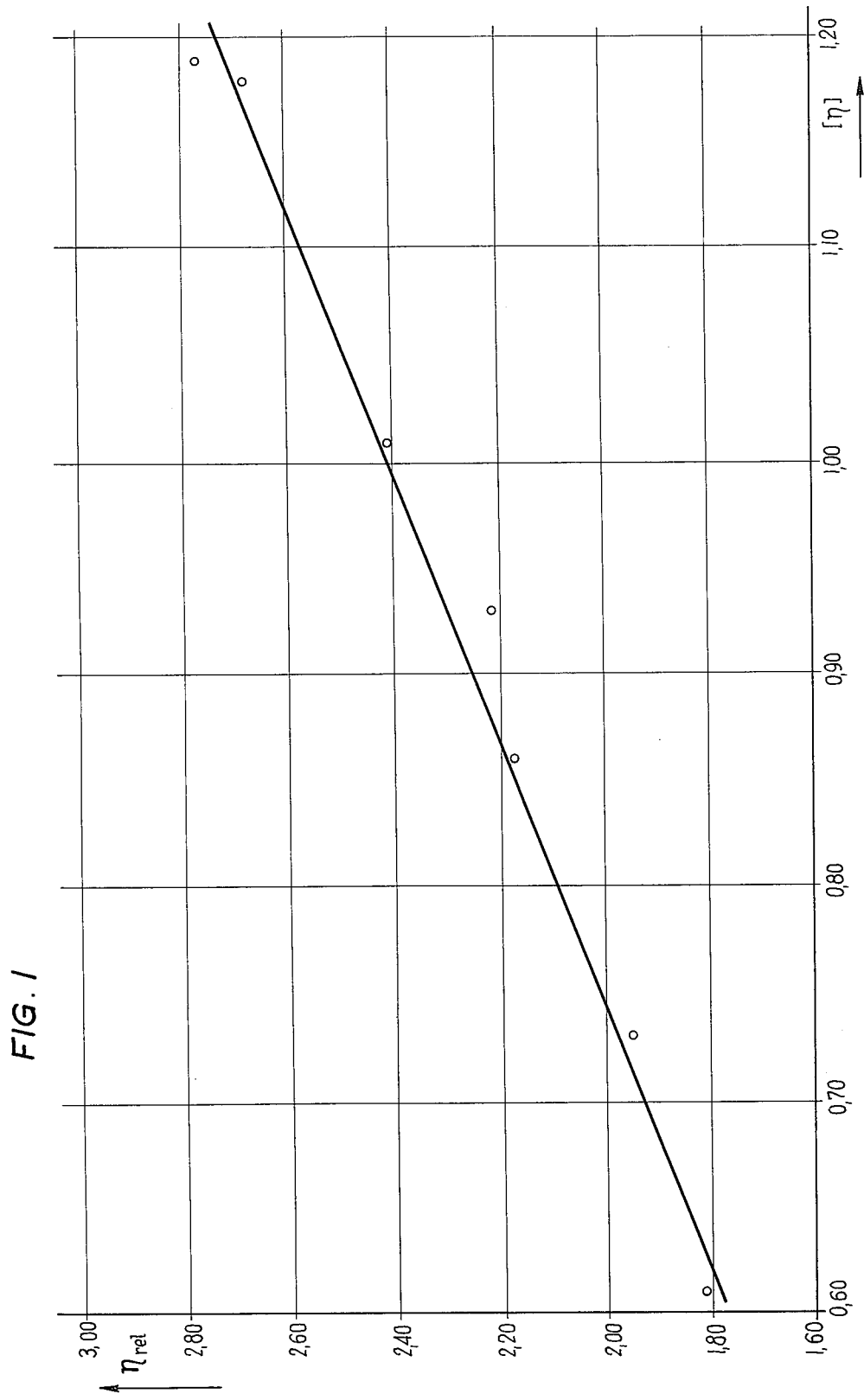
FIG. 1 is a conversion graph for relative and intrinsic viscosities.

Thermoplastic polyester melt precondensates and methods of preparing same, e.g. in a melt condensation vessel, are known and, per se, do not constitute subject matter to which the instant invention is directed. Such precondensates having an intrinsic viscosity from about 0.3 to about 1.0, preferably from about 0.6 to about 0.9, deciliter per gram (dl/g) are the basic materials for the present solid phase polycondensations.

The melt precondensate or melt condensate is cut into particles of essentially uniform size in order to keep the diffusion path of volatile alcohol components (formed in solid phase condensation) as uniform as possible for all particles of the condensate. The cut and generally uniformly shaped melt condensate usually has the form of chips, cubes, cylinders, balls, tablets or platelets, foil, flakes or fibers. Preferred dimensions in one direction are from 0.5 to 5 mm. The particle size should not fall below a certain minimum; otherwise the particles are packed too tightly, which greatly impairs volatilization of the alcohols which are gaseous under reaction conditions.

The melt condensate particles are charged into a reaction vessel and are then kept in constant motion either by rotation of the reaction vessel (e.g. tumbling dryer or rotary tube), by any other desired motion of the reaction vessel (e.g. vibrating motion) or by a mechanical rotary device within the reaction vessel (e.g. stirring). Even melt condensate which still contains moisture may be put into the reaction vessel; in such event the reaction vessel also has the function of a dryer. However, melt condensate surface moisture must be removed at temperatures below those of the glass transition temperature of the melt condensate in vacuo prior to solid phase polycondensation in order to avoid hydrolytic decomposition. The surface moisture is essentially removed when the steam partial pressure of the cut-up plastic (melt condensate) amounts to less than 1 torr.

Final drying is subsequently effected at temperatures up to 200°C in vacuo. The inert gas can be introduced at this time. After complete drying (the water content is to be kept below 0.02 percent by weight) of the precondensate, solid phase condensation is carried out under constant mechanical motion of the precondensate particles in contact with streaming inert gas at a pressure of below 1 torr and at a temperature of from 50° to 5°C below the melting point of the precondensate. By contact with the constantly fresh gas stream, diffusion and elimination of volatile components is considerably accelerated, whereby the reaction rate of the solid phase condensation is increased. The inert gas streaming rate is less than 2 liters per hour per kilogram of solid phase condensate. Increasing the streaming rate above that level does not effect a further increase in polycondensation rate within the error of measurement and the loss of inert gas becomes inordinately high. The streaming rate is usually maintained between about 0.05 and about 1 liter per hour per kilogram of solid phase condensate, preferably between 0.1 and 0.5 liter per hour per kilogram of solid phase condensate. Suitable inert gases are nitrogen, carbon dioxide and industrial waste gases. Rare gases, such as helium and argon, may be used. The inert gas, which is either a single gas or a combination of gases, can also be made to stream through the reaction bed, but it also suffices to let the inert gas stream over the reaction bed.

Preferred for use as a reaction vessel is an adapted vacuum dryer, e.g. a vacuum tumble dryer with a hollow axle. The adaptation, according to a specific embodiment of the invention, involves introducing a lance-shaped inlet pipe through the hollow axle of the vacuum dryer wherein the outlet opening for the inert gas is located close to the bottom of the dryer. This makes possible streaming the inert gas through the reaction bed. According to the size and embodiment of the dryer, there may be several outlets (nozzles).

In a vacuum dryer with a stationary housing the inlet pipe can be located in the bottom, or the inert gas can be introduced into the reaction chamber through holes in the casing.

In a vacuum dryer thus equipped, the precondensate is first dried in vacuo and crystallized; that means it is kept for several hours at 120° to 190°C, at which point inert gas can be brought into contact with it. With introduction of inert gas, the precondensate is then brought to the desired reaction temperature, and reaction is continued until the desired degree of polycondensation is reached.

The process applies (a) to all saturated, essentially linear polyesters or co-polyesters, in particular to those containing aromatic dicarboxylic acid esters, (b) to polyamides, (c) to polyester amides and (d) to polyanhydrides.

The invention relates particularly to solid phase condensation of saturated polyesters containing aromatic dicarboxylic acid ester radicals having 1 to 2 benzene rings and from 8 to 20 carbon atoms, from 0 to 10 mol %, in relation to the total amount of dicarboxylic acid radicals, of aliphatic dicarboxylic acid radicals, having from about 4 to about 10 carbon atoms and diol radicals having from 2 to about 20 carbon atoms, e.g. alkane diol radicals having from 2 to about 10 carbon atoms and cyclic diol radicals, such as 2.2-bis-[4'-($\beta$-hydroxyethoxyphenyl)] propane and 1,4-bis[hydroxymethyl]-cyclohexane. The melt condensates used according to the present invention, however, can also contain from 0.01 to 1 mol % of radicals of more than divalent alcohols or carboxylic acids. Preferred aromatic dicarboxylic acids are terephthalic, isophthalic, naphthalene-(2,6)-dicarboxylic and diphenyldicarboxylic acids. These aromatic dicarboxylic acids, however, can also be replaced, to a minor part, by adipic, sebacic and/or azelaic acid. The preferred divalent alcohols are ethylene glycol, diethylene glycol, propane-(1,3)-diol, butane-(1,4)-diol, 1,4-bis[hydroxymethyl] cyclohexane and 2,2-bis[4'-($\beta$-hydroxyethoxy) phenyl] propane. The preferred more-than-divalent alcohols are glycerine, erythritol, and pentaery-thritol; the preferred more-than-divalent carboxylic acids are tricarballylic acid, trimellitic acid, dioxybenzoic acid and tartaric acid. (Initially each acid may be in free acid form or in the form of a lower alkyl ester.)

The invention is apparent from the foregoing description and the following specific examples. Various changes may be made in the process without departing from the spirit and scope of the invention or sacrificing its material advantages. The details herein presented are merely illustrative of preferred embodiments and are not limitative of the invention.

EXAMPLE 1

111 grams (g) of a pulverized lead-antimony alloy (Pb:Sb - 3:7) are sifted to a particle size of 40 microns ($\mu$), suspended in 500 milliliters (ml) of ethylene glycol, and added, together with 160 g of dimethylterephthalate, to 86 liters (l) of ethylene glycol. To this, 80 g of calcium (dissolved in 15 l of ethylene glycol) are added. Methanol formation sets in at 106°C; the methanol formed is distilled off by means of a packed column with adjustable reflux. Within 4 hours 66 l of methanol are distilled off; the temperature in the reaction mixture rises to 202°C.

The ester interchange mixture thus obtained is pressed through a filter (with a mesh size of 40 $\mu$) into a second reaction vessel and is there heated to 275°C. After distilling off excess ethylene glycol, a vacuum of 0.5 torr is applied within 2 hours; after a further 3½ hours, an intrinsic viscosity of 0.75 deciliter per gram (dl/g) is reached. The reaction is then stopped and the obtained precondensate is cut (after quenching in water) into approximately cylinder-shaped granules of about 3 millimeters (mm) in length and 2.5 mm in diameter.

400 kilograms (kg) of the thus-obtained condensate are predried in a tumble dryer [1 cubic meter (m$^3$) capacity provided with a hollow lance protruding far into the interior with nitrogen connection and a nozzle of 1 mm in its head] for 3 hours at 50°C under a vacuum of 0.3 torr. The granules are subsequently heated to a temperature of 175°C within 5 hours at constant vacuum. The temperature of the granules is then raised [still at constant vacuum and with simultaneous introduction of nitrogen in amounts of 0.25 l (straight line II in FIG. 3), 1 l (straight line III in FIG. 3), 1.5 l (straight line IV in FIG. 3) and 3 l (straight line V in FIG. 3), per hour and per kilogram of precondensate] within 6 hours to 235°C. The granules are now kept for several hours at 235° ± 0.5°C and samples (for intrinsic viscosity determinations) are taken from time to time. Straight line I in FIG. 3 shows the course of the reaction without the use of nitrogen. The results of these measurements are represented in graphic form in FIG. 3, with the value of dl/g having been determined in 1% solutions of 1:1 phenol:tetrachloroethane at 30°C.

The most pronounced increase in the polycondensation rate is evident in the transition from 0 liters/kg hour (line I in FIG. 3) to 0.25 l/kg hour; the polycondensation rate still increases at the transition from 0.25 l/kg hour to 1 l/kg hour; while the increase is almost within the limit of error for viscosity measurements at the transition from 1 l/kg hour to 1.5 l/kg hour. For the increase from 1.5 l/kg hour to 3 l/kg hour, the rise in polycondensation rate is essentially smaller than the accuracy of the viscosity determinations.

Figure 2:
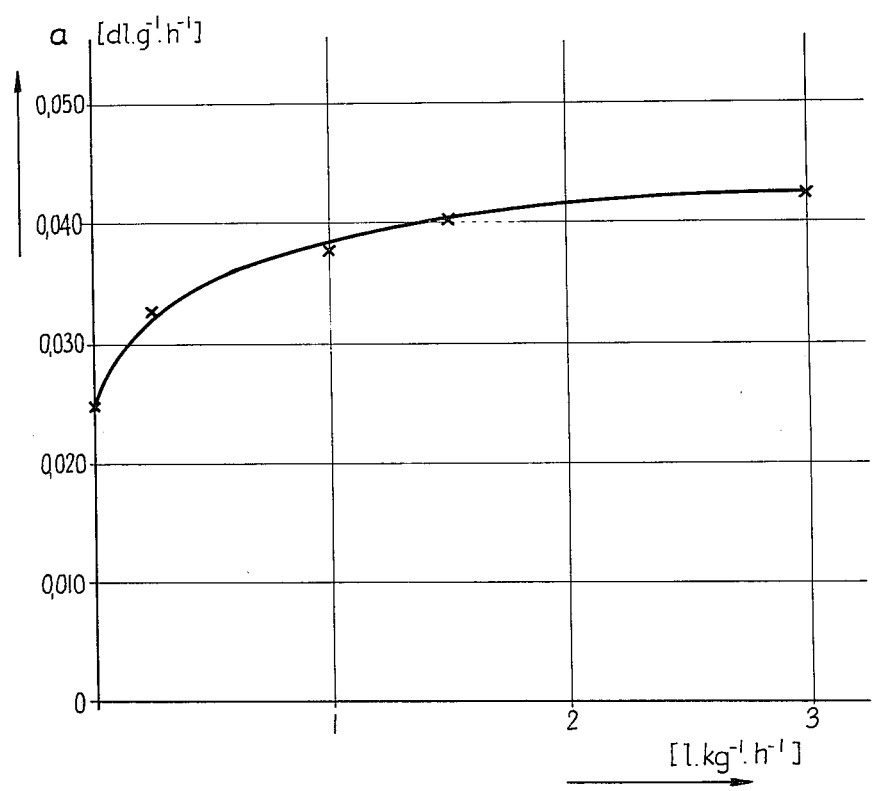

If the polycondensation rate [a] is plotted against inert gas streaming rate, FIG. 2 shows the increase in the polycondensation rate $a = d[\eta]/dt$ in relation to the streaming rate of nitrogen in liters/kg hour; an increase in the streaming rate above 2 liters per hour and per kilogram does not further increase the polycondensation rate.

EXAMPLE 2

400 kg of the precondensate described in Example 1 are predried in a tumble dryer (1 cubic meter capacity which is provided with a hollow lance protruding far into the interior with nitrogen connection and a 1 mm nozzle in its head) for 3 hours at 50°C under a vacuum of 0.3 torr. The granules are subsequently heated at even vacuum, i.e. 0.3 torr, within 5 hours at 175°C. The temperature of the granules is then increased, at still even vacuum and with introduction of nitrogen with a streaming rate of 1.5 l per hour and per kilogram of precondensate, within 6 hours to 235°C. The granules are then kept at 235° ± 0.5°C for several hours, with samples being taken from time to time for intrinsic viscosity determinations, which provide the following data:

| Polycondensation Time in hours [h] (after reaching 235°C) | Intrinsic Viscosity [dl/g] |
|---|---|
| 0 | 0.78 |
| 5 | 0.98 |
| 10 | 1.19 |
| 15 | 1.39 |
| 19 | 1.51 |

EXAMPLE 3

10 kg of a precondensate obtained according to Example 1 with an intrinsic viscosity of 0.74 dl/g are predried in a tumble dryer (100 liters capacity provided with a hollow lance with nitrogen connection and a 1 mm nozzle in its head protruding far into the interior) for 3 hours at 70°C under a vacuum of less than 1 torr and with introduction of 1.5 liters of nitrogen per hour and per kilogram of the granules. The granules are subsequently heated at constant vacuum within 3 hours to 235°C. The temperature of the granules is then kept, at still constant vacuum and a constant streaming rate of the nitrogen (1.5 liters per hour and per kilogram of the granules) for 10 hours at 235° ± 0.5°C, after which time the intrinsic viscosity is determined. The final viscosity is 1.34 dl/g.

Comparative Example to Example 3

10 kg of a polyethylene terephthalate precondensate of an intrinsic viscosity of 0.74 dl/g produced according to Example 1 are predried in a tumble dryer (100 liters capacity provided with a hollow lance with nitrogen connection having a 1 mm nozzle in its head and protruding far into the interior) for 3 hours at 70°C under a vacuum of less than 1 torr with introduction of nitrogen at the rate of 1.5 liters per hour and per kilogram of the precondensate. The granules are subsequently heated at still constant vacuum within 3 hours to 235°C. After this temperature is reached, the vacuum is removed by means of introduction of nitrogen and the streaming rate of the nitrogen is adjusted to 1.5 liters per hour and per kilogram of the precondensate. The granules are subsequently kept for 10 hours at 235° ± 0.5°C. The intrinsic viscosity obtained, however, amounts to only 1.02 dl/g.

In the preparation of the polyester melt precondensate employed in each of the examples, replacing the dimethylterephthalate, partially or wholly, by one or any combination of an equivalent of dimethylisophthalate, the dimethyl ester of naphthalene-(2,6)-dicarboxylic acid and the dimethyl ester of diphenyldicarboxylic acid produces essentially the same results in the subsequent solid phase polycondensation. Likewise, replacing up to 10 mol percent (based on the total dicarboxylic acid content of the reaction mixture from which the melt precondensate is prepared) of the dimethylterephthalate by an equivalent of one of any mixture of adipic acid, sebacic acid, azalaic acid and a dimethyl ester of each results in a precondensate suitable for the solid phase polycondensation illustrated in the specific examples.

In the same manner, a suitable melt precondensate is obtained by replacing the ethylene glycol of Example 1, partially or wholly, with an equivalent of one or any combination of diethylene glycol, pentane-(1,3)-diol, butane-(1,4)-diol, 2,2-bis-[4'-(β-hydroxyethoxy)-phenyl]propane and 1,4-bis(hydroxymethyl)cyclohexane. From such a melt precondensate having an intrinsic viscosity of from 0.3 to 1.0 deciliter per gram solid phase polycondensates having similarly increased intrinsic viscosities are prepared in the same manner as exemplified by Examples 1 to 3. For the purposes of the subject invention, replacing from 0.01 to 1 mol percent of the ethylene glycol of Example 1 by an equivalent of one or any combination of glycerine, erithritol, pentaerithritol, tricarballylic acid, trimellitic acid, dioxybenzoic acid, tartaric acid and a methyl ester of each of the acids results in a corresponding melt precondensate which yields a similar advantageous intrinsic viscosity increase when subjected to solid phase polycondensation as exemplified.

What is claimed is:

1. A process for solid phase polycondensation of particles of thermoplastic polyester melt precondensate at an essentially constant temperature of from 5° to 50° C below the melting point of the precondensate and under vacuum and streaming inert gas and wherein intrinsic viscosity of the precondensate is increased, the process comprising effecting solid phase polycondensation under a vacuum of less than 1 torr, with the precondensate in contact with an inert gas stream, and with the inert gas maintained at a streaming rate which is less than 2 liters per hour per kilogram of the precondensate during the polycondensation.

2. A process according to claim 1 wherein the polyester melt precondensate is a saturated polyester and melt condensate of:
   a. aromatic dicarboxylic acid having one or two benzene rings and from 8 to 20 carbon atoms;
   b. from 0 to 10 mol percent, based on total dicarboxylic acid, or aliphatic dicarboxylic acid having from 4 to 10 carbon atoms;
   C. diol having from 2 to 20 carbon atoms; and
   d. from 0 to 1 *mol percent of at least one more-than-divalent member selected from the group consisting of alcohol and carboxylic acid;*
   each acid being initially in free-acid form or in the form of a lower alkyl ester.

3. A process according to claim 2 wherein the diol is an alkane diol having from 2 to 10 carbon atoms or a cyclic diol having up to 20 carbon atoms.

4. A process according to claim 3 wherein the cyclic diol is a member selected from the group consisting of 2,2-bis-[4'-($\beta$-hydroxyethoxy)phenyl]propane and 1,4-bis(hydroxymethyl)-cyclohexane.

5. A process according to claim 2 wherein the melt precondensate contains from 0.01 to 1 mol percent of radicals of the more-than-divalent member.

6. A process according to claim 1 wherein the streaming rate is from 0.05 to 1 liter per hour and per kilogram of the precondensate.

7. A process according to claim 6 wherein the streaming rate is from 0.1 to 0.5 liter per hour per kilogram of the precondensate.

8. A process according to claim 2 wherein the melt precondensate, immediately prior to solid phase polycondensation, has an intrinsic viscosity of from 0.3 to 1.0 deciliter per gram.

9. A process according to claim 8 wherein the intrinsic viscosity of the melt precondensate, immediately prior to solid phase polycondensation, is from 0.6 to 0.9 deciliter per gram.

10. A process according to claim 8 wherein the intrinsic viscosity of the precondensate is increased at an average rate of at least 0.03 deciliter/gram per hour of solid phase polycondensation over a period of from 5 to 20 hours.

11. A process according to claim 10 wherein the average rate is bout about 0.04 deciliter/gram or more per hour of solid phase polycondensation over a period of from 5 to 20 hours.

12. A process according to claim 8 wherein the melt precondensate particles are maintained in continuous motion during solid phase polycondensation.

13. A process according to claim 8 wherein water content of the polyester melt precondensate particles, immediately prior to polycondensation, is less than 0.01 percent by weight.

14. A process according to claim 13 wherein the polyester melt precondensate is essentially free from hydrolytic decomposition immediately prior to solid phase polycondensation and the inert gas is nitrogen.

15. A process according to claim 1 having a combination of steps which consists essentially of:
   a. effecting the polycondensation at an essentially constant temperature which is from 50° to 5° C below the melting point of the precondensate;
   b. effecting the polycondensation under a vacuum of less than 1 torr;
   c. maintaining the solid phase melt precondensate in contact with streaming inert gas during the solid phase polycondensation; and
   d. maintaining the inert gas at a streaming rate which is about 0.05 to less than 2 liters per hour per kilogram of the precondensate.

* * * * *